Aug. 16, 1938.  E. A. JOHNSTON ET AL  2,127,032
TRACTOR FRAME
Original Filed July 5, 1935  2 Sheets-Sheet 1
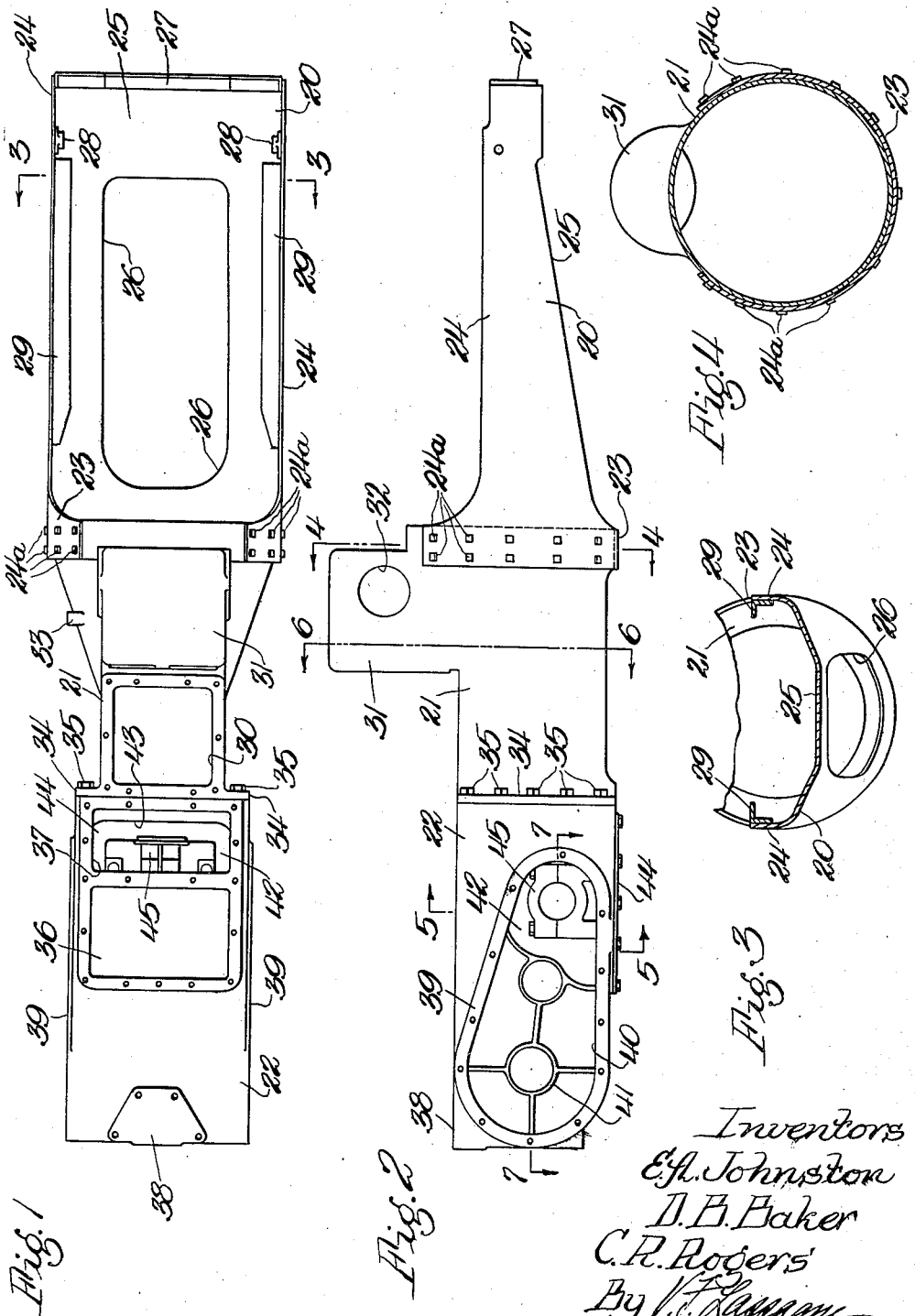

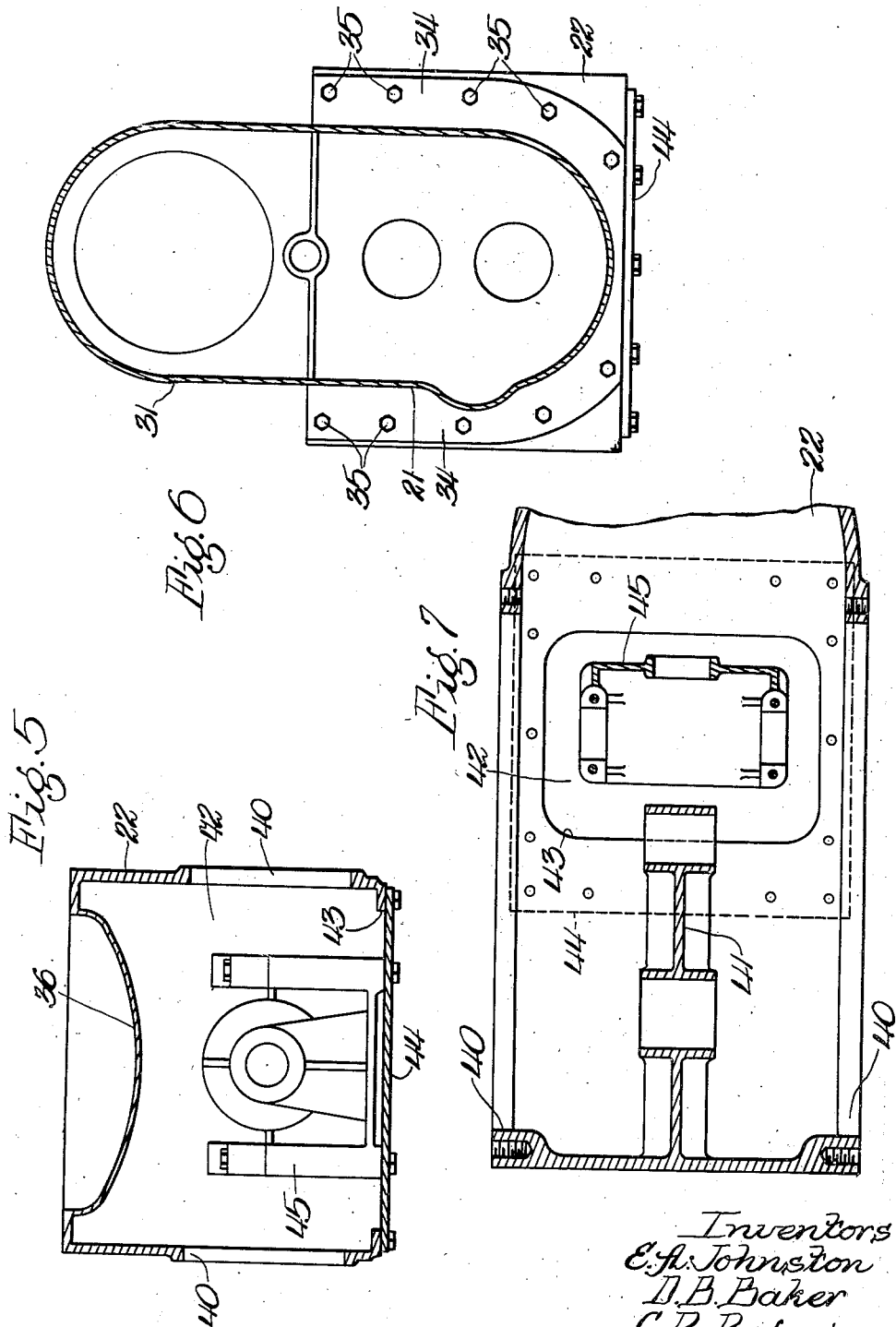

Patented Aug. 16, 1938

2,127,032

UNITED STATES PATENT OFFICE

2,127,032

TRACTOR FRAME

Edward A. Johnston, Chicago, David B. Baker, Riverside, and Clifford R. Rogers, Oak Park, Ill., assignors to International Harvester Company, Chicago, Ill., a corporation of New Jersey Original application July 5, 1935, Serial No. 29,798. Divided and this application May 16, 1936, Serial No. 80,055

9 Claims. (Cl. 280—106)

The invention relates to tractors, and more particularly to an improved frame or body construction therefor, this application being a divisional of Patent No. 2,086,807 to Edward A. Johnston et al., filed July 5, 1935, for Tractors.

The main object of the invention is to provide an improved tractor frame which will be rigid and strong and serve to carry the motor and all transmission mechanism in an improved manner.

Incidental objects will become apparent to those skilled in this art as the disclosure is more fully made.

Briefly, the improved frame is built up of three main parts, the front part constituting a motor carrying bracket, which is longitudinally disposed and at its rear end is formed as a saddle to receive and be joined rigidly to the front end of a change speed gear box that constitutes the middle part of the frame. This middle part includes an upward extension to serve as a mount for certain auxiliary power take-off gearing and shafting, the rear end of said middle part further being joined at its rear end to the front end of a relatively wide and large final drive gear box, constituting the third part of the frame or body. The said rear part is specially constructed to make the gearing therein accessible for repairs and inspection, with portions thereof mounted on a quickly removable floor bracket, all as will later more fully appear.

The improved frame is shown in the accompanying sheets of drawings, wherein:

Figure 1 is a general plan view of the frame;

Figure 2 is a side elevational view thereof;

Figure 3 is a transverse cross-sectional view taken along the line 3—3 of Figure 1, looking in the direction of the arrows;

Figure 4 is a transverse cross-sectional view taken along the line 4—4 of Figure 2, looking in the direction of the arrows;

Figure 5 is a transverse cross-sectional view taken along the line 5—5 of Figure 2, looking in the direction of the arrows;

Figure 6 is a transverse cross-sectional view taken along the line 6—6 of Figure 2, looking in the direction of the arrows; and, Figure 7 is a sectional view taken along the line 7—7 of Figure 2, looking in the indicated direction.

The main frame, as shown in Figures 1 and 2, embodies three main parts, as follows: First, a front bracket 20 for supporting the motor of the tractor, said bracket preferably being stamped from a heavy sheet of steel; second, an intermediate housing part 21 for the change speed gear set and auxiliary power take-off mechanism; and, lastly, the rear housing 22 for the final drive gear mechanisms. The two parts 21 and 22 are preferably cast.

The part 20 is preferably formed in one piece as a heavy sheet metal stamping, as has been stated, said piece at its rear end embodying a U-shaped or semi-circularly formed saddle part 23, into which the similarly formed front end of the middle cast part 21 is fitted. The saddle portion 23 of the part 20 is thereupon bolted permanently by bolts 24ᵃ to the part 21. The front piece 20 embodies two longitudinal side walls 24 and a bottom 25, which is formed with a cut-out opening 26. The bottom of the crank case of the motor, which is carried by this part 20, extends downwardly through this opening 26. The front end of the frame part 20 carries a U-shaped angle bar 27, which is welded to the inner front edges of the side wall portions 24. Near their front ends the side wall portions 24 carry in transverse alignment, a pair of bosses, or sleeves, 28, having transversely aligned openings for the purpose of carrying a motor mount bracket, not shown. The inside face of the opposite side arms, or walls, 24 have each welded thereto an angle bar 29 providing a horizontal ledge, upon which the motor is to be carried.

The middle unit 21 is formed as a cast, generally rectangularly shaped box, closed at its bottom, the rear upper portion thereof being flat and having formed therein a large opening 30, while the forward portion of the box 21 is extended upwardly, as at 31, to provide an auxiliary compartment for a pulley take-off, said upward extension 31 having aligned side openings 32 formed therein for the purpose of carrying a shaft. The left hand side of the part 21 below the upward extension 31 carries a transverse boss 33, which is bored to receive and journal a transverse rock-shaft used for releasing the collar that controls an engine clutch, not shown. The flange at the top of the part 21 surrounding the opening 30 is provided with holes to receive a cover plate in the usual manner. The rear transverse wall of the part 21 is extended laterally to form a flange 34 to receive bolts 35 for connecting the part 21 to the rear or final drive housing 22, which, it will be noted, is also substantially rectangular in shape and formed as a cast box, the same being slightly wider than the rear end of the part 21.

The top of this rear box 22 has a portion closed by a depressed cover 36, and, forwardly thereof, the box top is formed with a large opening, the cover 36 and opening 37 being surrounded by a machined edge formed with bolt holes, so that a cover housing, not shown, may be bolted in place over the cover 36 and opening 37. This cover housing is shown in the parent application heretofore identified and provides a power take-off shaft assembly with the cover 36 forming a tight bottom or floor therefor. The rear end of the part 22 on its top side and along the longitudinal median line of the frame has a machined surface 38. The opposite sides of the part 22 are formed with a bolt-receiving flange 39 forming side wall portions delineated by said flange to provide at each side of the part 22 transversely aligned openings 40 for assembling the final drive unit. Centrally between the openings 40 on the longitudinal axis of the part 22 and integral therewith, is formed a bearing box structure 41. Between this structure 41 and the front wall of the part 22 is a large space 42 for a purpose to appear later.

The front wall of the part 21 is open to afford communication with the rear portion of the front motor carrying bracket piece 24, and the rear end of the middle box part 21 is open to afford communication with the front open end of the rear box part 22, so that the various units arranged in the three different frame parts may be operatively connected together. From this it can now be seen that a sturdy, three-piece main frame is afforded when the three parts are rigidly bolted together to provide a strong frame or backbone for the tractor.

The forward portion of the floor of the rear box part 22 is formed with a large opening 43 under the space 42 mentioned, said opening being closed by a bottom cover plate 44 secured to the box 22 for quick removal. This floor cover plate 44 carries a bracket structure 45 secured to the plate 44 for removal therewith, said bracket serving in the tractor to support and journal certain shafts and gears not herein shown.

When the three main parts 20, 21 and 22 are bolted together in the manner described, there is provided a rigid main frame forming the longitudinal backbone of the tractor with which it is used. The front bracket part 20 serves as a motor mount, and the rear saddle part thereof merges into the front portion of the intermediate part 21 to provide a bell housing for the master or engine clutch, with the change speed gear set located in the rear portion of the part 21. The upper extension 31 thereof forms a suitable place for a pulley take-off assembly, the drive shaft for which may be mounted in the openings 32 described.

The rear box part 22 encloses and carries the final drive transmission gearing for the traction supports, such as wheels or crawlers, and one train of gearing passes up through the opening 37 into an upper cover housing, not shown, and mounted above the cover 36 for driving a power take-off shaft arrangement, a portion of which may be carried on the pad 38 described.

It is intended to cover herein all changes and modifications of the preferred embodiment disclosed which do not depart from the spirit and scope of the invention as hereinafter claimed.

What is claimed is:

1. A tractor frame having a rear part comprising a substantially rectangular box adapted to enclose final drive gearing and having its front wall formed with a bolt circle flange, a second transmission box part adapted to enclose change speed gearing and located forwardly of the rear part and having a flange at its rear end bolted to the bolt circle on the front wall of the rear part, the front portion of said second part being secured to the rear end of a bracket arranged forwardly of the second part, said bracket being formed of pressed sheet metal and including rails welded to opposite sides thereof, upon which rails a motor is adapted to be carried, said bracket at its rear end being formed with a saddle portion in which the front end of the second part is telescopically fitted, and means securing the saddle portion rigidly to the front end of the second part.

2. A tractor frame having a rear part comprising a substantially rectangular box adapted to enclose final drive gearing and having its front wall formed with a machined bolt circle flange, a second transmission box part located forwardly of the rear part and having a flange at its rear end bolted to the bolt circle on the front wall of the rear part, the front portion of said second part being secured to the rear end of a bracket arranged forwardly of the second part, said bracket at its rear end being formed with a saddle portion in which the front end of the second part is fitted, means securing the saddle portion rigidly to the front end of the second part, said rear part having an opening in its floor, and a plate closing said opening, said plate adapted for carrying shafts and gearing within the said rear part and removable with the plate as a unit.

3. A longitudinal elongated tractor frame embodying a front part, an intermediate part and a rear part arranged in end to end relation from front to rear in the order stated, said front part comprising a sheet metal bracket having means adapted to support a motor and having its rear end formed as a U-shaped saddle, the intermediate part comprising a box adapted to carry a change speed gear set and including a front end nested in the said saddle, means securing the saddle to the front end of the intermediate part, said rear part constituting another box adapted to carry final drive transmission gearing, and means for securing the rear end of the intermediate part to the front end of the rear part.

4. A longitudinal elongated tractor frame embodying a front part, an intermediate part and a rear part arranged in end to end relation from front to rear in the order stated, said front part comprising a shallow bracket having means adapted to support a motor and provided with a relatively deep rear end formed as a semi-circular saddle, the intermediate part comprising a box adapted to carry a change speed gear set and including a front end nested in said saddle so that the latter overlaps the sides of the box, means securing the front end of the box and saddle rigidly together, the rear part constituting another box of relatively greater width than the rear end of the intermediate box part, said rear box adapted to carry final drive transmission gearing and having its front end bolted to rear flanges provided at the rear end of said intermediate part.

5. A longitudinal elongated tractor frame embodying a front part, an intermediate part and a rear part arranged in end to end relation from front to rear in the order stated, said front part comprising a shallow bracket having means adapted to support a motor and provided with a relatively deep rear end formed as a substantially semi-circular saddle, the intermediate part comprising a box adapted to carry a change speed gear set and including a front end overlapped at its sides by said saddle and secured rigidly thereto, said intermediate part including a housing extension extending upwardly a substantial distance above the upper end of the saddle, said extension adapted to carry and house gearing for an auxiliary power take-off means, and the rear part constituting a box secured to the intermediate part and adapted to house final drive mechanism.

6. A longitudinal elongated tractor frame embodying means at its forward end adapted to carry a change speed gear set and a motor, a rear transmission box included in the frame, said box being substantially rectangular and having a closed top provided with an opening near its front end, and a depressed cover portion in said top disposed rearwardly of the opening, said depressed cover portion and opening being surrounded by a finished bolt circle flange, and said depressed cover portion adapted to serve as the floor for a dry clutch compartment adapted to be bolted to said bolt circle flange.

7. A longitudinal elongated tractor frame embodying means at its forward end adapted to carry a change speed gear set and a motor, a rear transmission box included in the frame, said box being substantially rectangular and having a closed top provided with an opening near its front end, a depressed cover portion in said top disposed rearwardly of the opening, said depressed cover portion and opening being surrounded by a finished bolt circle flange, the depressed cover portion adapted to serve as the floor for a dry clutch compartment adapted to be secured to said bolt circle flange and a finished pad on said top at its rear edge disposed along the longitudinal median line of the box adapted to carry a support for a longitudinally rearwardly extending power take-off shaft.

8. A longitudinal elongated tractor frame embodying means at its forward end adapted to carry a motor and an intermediate portion rearwardly thereof adapted to house a change speed gear set, said frame including a substantially rectangular rear box part having a top and a bottom floor formed with an opening, a cover plate removably fastened to the bottom floor on its under side to close said opening, and a shaft mount bracket carried on said plate and removable therewith downwardly out of said opening.

9. A longitudinal elongated tractor frame embodying means at its forward end adapted to carry a motor and an intermediate portion rearwardly thereof adapted to house a change speed gear set, said frame including a substantially rectangular rear box part having a top and a bottom floor formed with an opening, a cover plate removably fastened to the bottom floor on its under side to close said opening, a bracket carried on said plate within the housing when the plate is in floor opening closing position, said box being formed with opposite side openings, and a second shaft mount bracket included in the box and disposed rearwardly of the floor opening along the longitudinal median line of the box.

EDWARD A. JOHNSTON.
DAVID B. BAKER.
CLIFFORD R. ROGERS.